United States Patent [19]

Bovermann

[11] Patent Number: 5,326,162
[45] Date of Patent: Jul. 5, 1994

[54] RACK FOR A CONTROL CABINET

[75] Inventor: Klaus D. Bovermann, Breidenbach-Niederdieten, Fed. Rep. of Germany

[73] Assignee: Rittal-Werk Rudolf Loh GmbH & Co. KG, Fed. Rep. of Germany

[21] Appl. No.: 978,213

[22] Filed: Nov. 17, 1992

[30] Foreign Application Priority Data

Nov. 18, 1991 [DE] Fed. Rep. of Germany ....... 4137836

[51] Int. Cl.⁵ .................. A47B 47/00; C04H 12/00
[52] U.S. Cl. .................... 312/265.1; 52/653.1
[58] Field of Search ............ 312/265.1–265.4; 52/653.1; 108/109; 16/135

[56] References Cited

U.S. PATENT DOCUMENTS 3,743,373  7/1973  Camper et al. ............... 312/111 X
4,235,493  11/1980  Bridges et al. ................ 312/263 X
4,692,984  9/1987  McKernan et al. ............ 312/257 R
5,103,604  4/1992  Teron .......................... 52/791.14

Primary Examiner—Kenneth J. Dorner
Assistant Examiner—Nancy Mulcare
Attorney, Agent, or Firm—Speckman, Pauley & Fejer

[57] ABSTRACT

A rack for a control cabinet comprising a front and rear frame with vertical and horizontal frame pieces connected to each other by upper and lower depth braces, where the vertical and horizontal frame pieces, as well as the depth braces each form, with two sides disposed perpendicular to each other, an inner edge, and where identical rows of identical fastening receptacles and/or fastening bores are formed in these sides at the same distance from the inner edge. A selective installation of components with metric or inch division is achieved by means of a new profile for the frame pieces of the rack and by additional installation frames which can be connected to the rack.

13 Claims, 6 Drawing Sheets

RACK FOR A CONTROL CABINET

BACKGROUND OF THE INVENTION

1. Field of the Invention

This invention relates to a rack for a control cabinet comprising a front and rear frame with vertical and horizontal frame pieces which can be connected to each other by upper and lower depth braces, where the vertical and horizontal frame pieces, which are welded together in the corner areas and welded to corner connectors, as well as the depth braces each form, with two sides located perpendicularly to each other, an inner edge, and where identical rows of identical fastening receptacles and/or fastening bores are provided in these sides at the same distance from the inner edge, where the vertical and horizontal frame pieces have identical cross sections and identical rows of fastening receptacles and/or fastening bores.

2. Description of Prior Art

A rack of this type is taught by German Patent Publication DE 33 44 598 C1 where the frame pieces are cut to length from a uniform hollow profile section. In this rack, the rows of fastening receptacles and/or fastening bores offer universal installation possibilities in both directions of the cabinet interior as well as beyond the cabinet interior to adjoining, lined-up control cabinets. The division of the fastening receptacles and/or fastening bores in the row is metric, so that component supports or the like for components divided by inches cannot be easily installed in the rack.

German Patent Publication DE 39 20 353 A1 teaches a rack where two frames are made from C-profile sections, which are welded together in the corner areas. The C-profile sections have a base leg, two lateral legs and, at their ends, end sections bent at right angles and oriented towards each other. One profile side of an end section forms an inner edge with another profile side. These profile sides are provided with identical rows of identical fastening receptacles or fastening bores. In this known rack, the C-profile sections are mitered and welded together to form two frames. The two frames are connected to each other in the corner areas by four horizontal braces. In this case, the ends of the horizontal braces are welded to the frame. The fastening receptacles or fastening bores in this embodiment of the frame pieces are not suitable for the selective installation of components with metric division or inch division.

German Patent Publication DE 34 23 721 A1 teaches a rack where rails extending perpendicular to two vertical frame pieces can be installed between these, but which does not offer any additional fastening opportunities.

German Patent Publication DE 88 14 472 U1 discloses a rack which is also constructed of horizontal and vertical frame pieces and only permits the installation of components with a single pre-determined division. The same holds true for the mounting rails which can be installed in a rack in accordance with French Patent Publication FR 24 20 233.

SUMMARY OF THE INVENTION

It is the object of this invention to provide a rack of the previously mentioned type in which the division of the rows of fastening receptacles and/or fastening bores is maintained and the components can be installed with inch division in the rack.

This object is attained in accordance with one embodiment of this invention where, for the installation of component supports or the like for receiving components with inch division, the vertical and the horizontal frame pieces as well as the depth braces are embodied as C-profile sections with a base leg and two lateral legs having, at their ends, end sections bent at right angles and oriented towards each other. The open sides of the C-profile sections are disposed on the outer sides of the rack, and the horizontal frame pieces cover the vertical frame pieces in the corner areas. The fastening receptacles and/or fastening bores are cut in metric division into the base legs and the inwardly directed lateral legs of the C-profile sections. The corner connectors are welded into the end areas of the horizontal frame pieces and the inner lateral legs of the horizontal frame pieces are recessed in the end areas. The depth braces have extended base legs embodied as fastening flanges which can be connected to the corner connectors and which terminate with their base legs flush with the base legs of the vertical frame pieces. Installation rails, extending over at least a portion of the height of the rack and provided with lateral legs with fastening receptacles in inch division, are connected to the base legs of the vertical frame pieces as well as to mounting rails installed between the front and rear vertical frame pieces.

A broad connecting surface for the installation of the installation rails is created by this design of the vertical and horizontal frame pieces. In this case, it is also possible to provide only part of the height of the cabinet with installation rails. Furthermore, the C-profile sections form frame-like sealing and attachment bars on the outer sides, which make lining up racks and the tight closure of the rack sides easier. In this connection, it is preferably provided that the rows of fastening receptacles in the base legs of the C-profile sections have the same distance to the common edge as the rows of fastening receptacles of the inner lateral legs adjoining these edges, in order to be able to use the same connecting means in both directions.

The connection of the vertical and horizontal frame pieces into a fixed frame is achieved in accordance with one embodiment of this invention where the front surfaces of the vertical frame pieces abut the base legs of the horizontal frame pieces and are welded together to them, where the front surfaces of the horizontal frame pieces terminate flush with the end sections of the vertical frame pieces and where the outer lateral legs of the vertical and horizontal frame pieces are located in one plane and form an attachment frame.

In accordance with a particularly preferred embodiment of this invention, to provide sealing and lining up, the end sections of the inner lateral legs of the depth braces are located in one plane with the end sections of the inner lateral legs of the vertical frame pieces and form an attachment frame.

In accordance with one embodiment of this invention, the rear vertical frame pieces in the base legs are equipped with openings, thereby permitting installation of sockets or the like in these openings.

In accordance with another preferred embodiment of this invention, the installation rails are essentially U-shaped profiled sections with base legs and two lateral legs and fastening receptacles are cut into these lateral legs in the same order.

To attach slide rails for inserts on the installation rails in accordance with one embodiment of this invention, the base leg of the installation rail is provided with an elevated attachment section in the center in the form of two support sections, which is located in one plane with the ends of the lateral legs and is provided with a row of hanger receptacles.

To attach the installation rails to the vertical frame pieces or the mounting rails, the base legs of the installation rails are equipped with fastening bores.

This invention will be described in detail in conjunction with the drawings.

DESCRIPTION OF PREFERRED EMBODIMENTS

Figure 1:
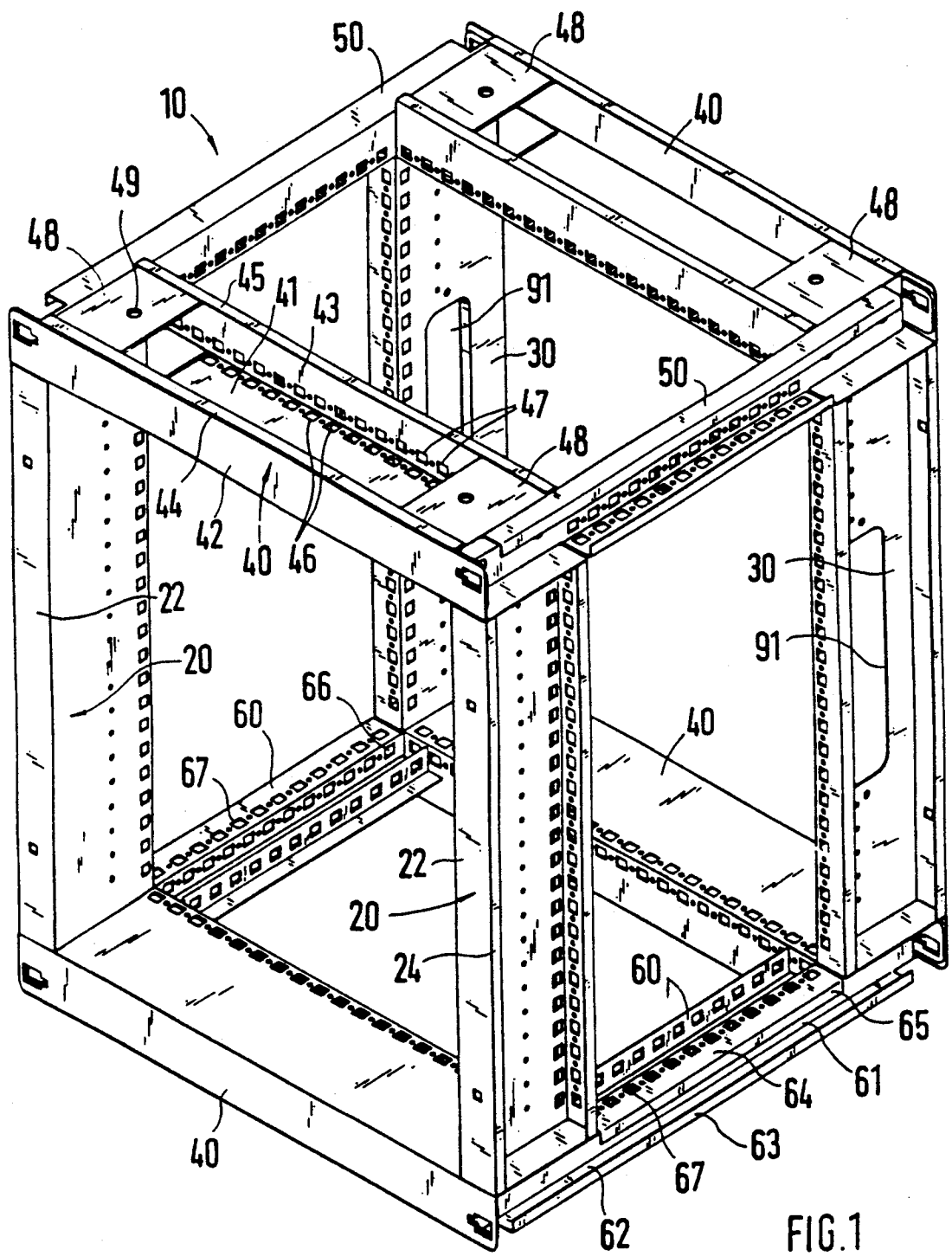
FIG. 1 is a perspective view of a rack in accordance with one embodiment of this invention with vertical and horizontal frame pieces and with depth braces in the assembled state.

FIG. 1 shows a rack 10 for a control cabinet in accordance with one embodiment of this invention. Two front vertical frame pieces 20 and two horizontal frame pieces 40 are fixedly connected to form a front frame on the front of the rack 10. Two rear vertical frame pieces 30 and two horizontal frame pieces 40 form a rear frame at the rear of the rack 10. The two frames are connected to each other by two upper depth braces 50 and two lower depth braces 60.

Figure 2:
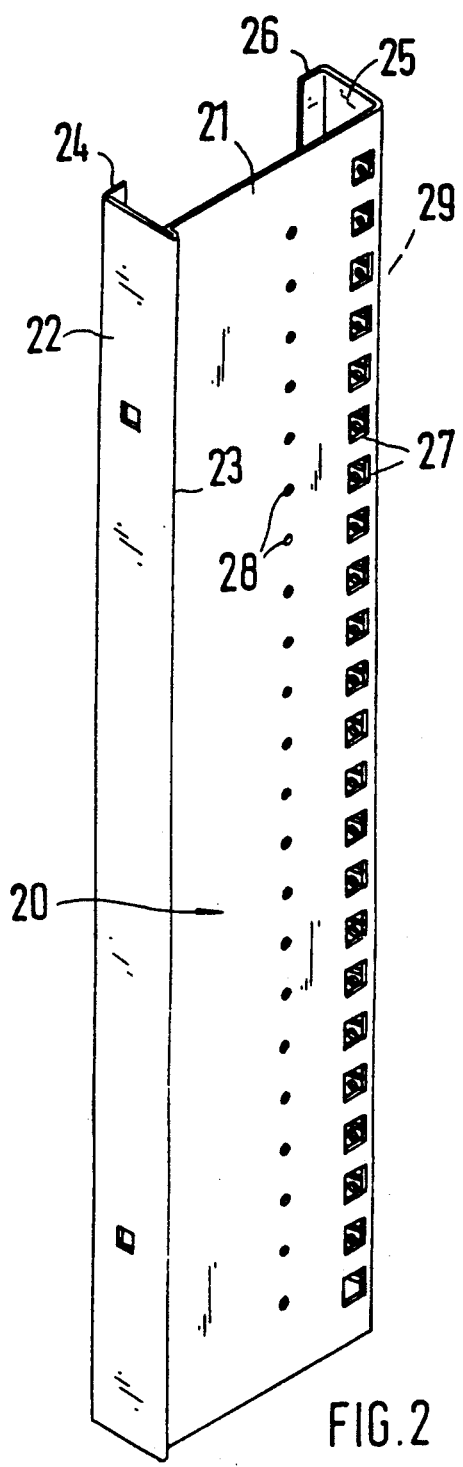
FIG. 2 is a perspective view of a front vertical frame piece of a rack in accordance with one embodiment of this invention.

The vertical frame pieces 20 and 30 have the same cross section as the horizontal frame pieces 40 and are embodied as C-profile sections. As shown in FIG. 2, a broad base leg 21 is provided on the front vertical frame pieces 20, which is followed by the two lateral legs 22 and 25. In this case, the lateral leg 22 protrudes in the form of an attachment flange 23 from the base leg 21. The lateral leg 25 has a (covered) row of fastening receptacles 29, which has a preset distance from the common edge of the lateral leg 25 and of the base leg 21. An identical row of identical fastening receptacles 27 is cut at the same distance from the edge into the base leg 21. Both rows of fastening receptacles 27 and 29 have metric division. A row of fastening bores 28 has been drilled approximately at the center of the base leg 21, which is provided with the same metric division.

Figure 3:
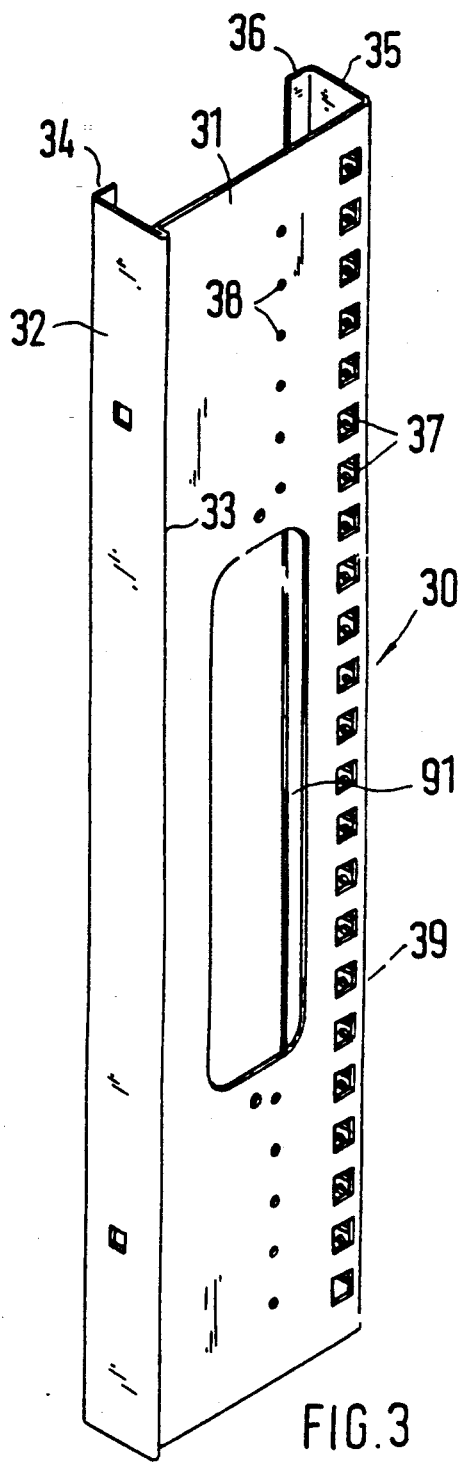
FIG. 3 is a perspective view of a rear vertical frame piece of a rack in accordance with one embodiment of this invention.

As can be easily seen from FIG. 3, the rear vertical frame pieces 30 with the base leg 31, the two lateral legs 32 and 35, the rows of fastening receptacles 37 and 39 and the row of fastening bores 38 are identical with the front vertical frame pieces 20 of FIG. 2. Even the end sections 34 and 36, bent at right angles towards each other in the ends of the lateral legs 32 and 35, correspond to the end sections 24 and 26 of the lateral legs 22 and 25 of the front vertical frame piece 20 of FIG. 2. The only difference is that an opening 91 has been cut into the base leg 31 of the rear vertical frame piece 30 for the installation of sockets or the like.

The horizontal frame pieces 40 with the base leg 41, the lateral legs 42 and 43, the end sections 44 and 45 and the rows of fastening receptacles 46 and 47 have the same cross section as the vertical frame pieces 20 and 30.

Figure 4:
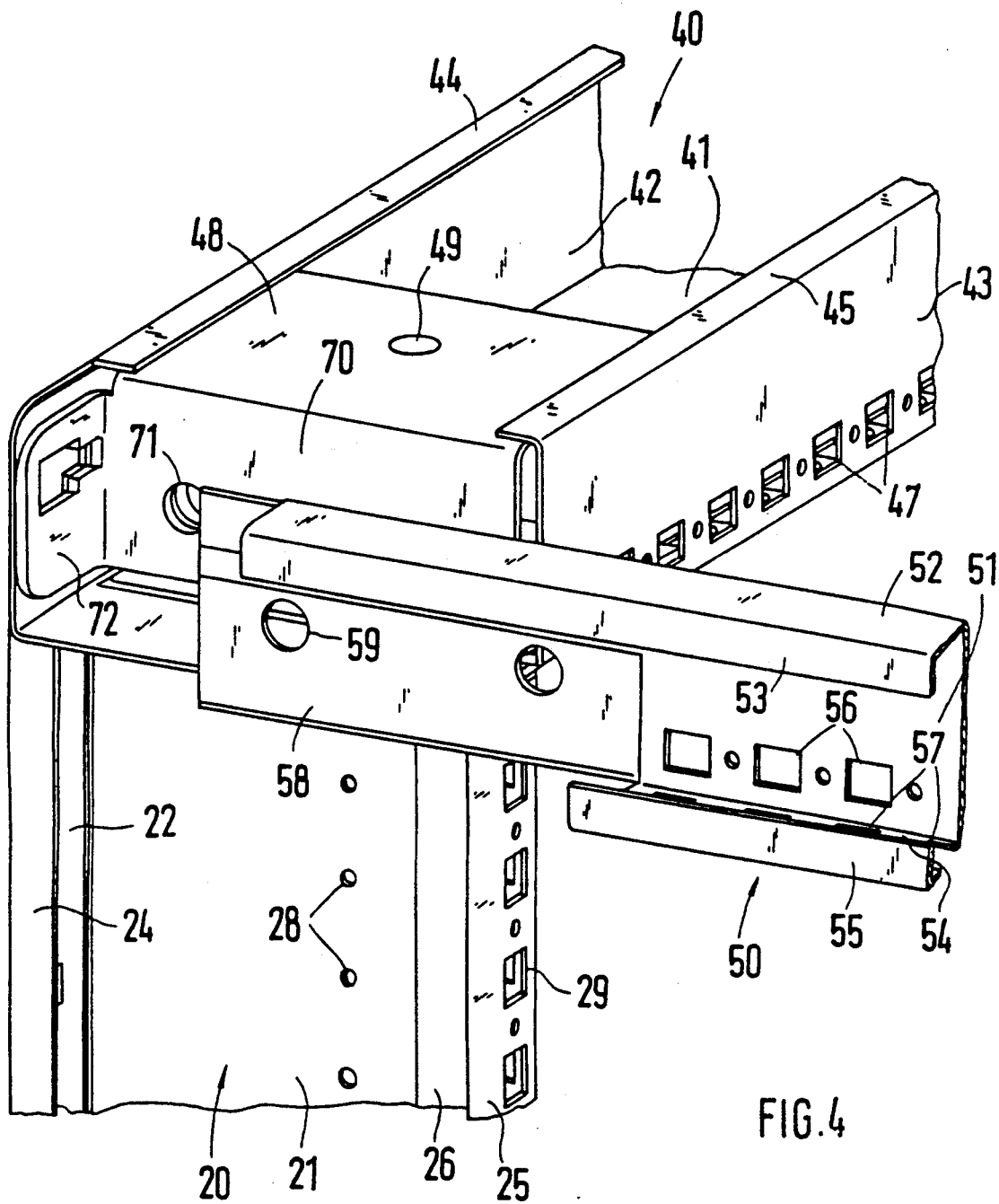
FIG. 4 is a schematic view of the attachment of a depth brace at a corner of a frame where a vertical and horizontal frame piece abut on each other and are fixedly connected to each other in a rack in accordance with one embodiment of this invention.

As shown in FIG. 4, the vertical and horizontal frame pieces 20 or 30 and 40, embodied as C-profile sections, are fixedly welded to each other at the corners. The horizontal frame piece 40 covers the front surface of the vertical frame pieces 20 and 30 in such a way that the front surface is located in one plane with the end sections 24 and 26 of the lateral legs 22 and 25. The open sides of the C-profile sections are always outwardly directed. The lateral legs 25 of the vertical frame pieces 20 or 30 and the lateral legs 43 of the horizontal frame pieces 40 form a connecting plane on the frame, which is directed towards the cabinet interior. Perpendicularly thereto, the base legs 21 or 31 of the vertical frame pieces 20 or 30 and the base legs 41 of the horizontal frame piece 40 form further connecting planes. All these connecting planes are provided with rows of fastening receptacles 29, 47 or 39, 47. With both frames, the outwardly pointing lateral legs 22 and 42 of the vertical frame pieces 20 and 30 and the horizontal frame piece 40 form further attachment bars on the sides, the bottom and the ceiling of the rack with their end sections 24 and 26.

The upper depth braces 50 are also embodied as C-profile sections with a base leg 51, two lateral legs 52 and 54 with the end sections 53 and 55, as well as a row of fastening receptacles 56 in the base leg 51 and a row of fastening receptacles 57 in the lateral leg 54, which again forms the inner lateral leg at the frame piece 10. However, the cross section of the depth braces is less. The lower depth braces 60 have a cross section corresponding to the cross section of the upper depth braces 50. Only a further fastening flange with fastening receptacles has been formed on towards the cabinet interior. The lower depth braces 60 have a base leg 61, two lateral legs 62 and 64 with the end sections 63 and 65 as well as a row of fastening receptacles 66 in the base leg 61 and a row of fastening receptacles 67 in the inner lateral leg 64.

As FIG. 1 shows, the rack has an inner edge on each frame piece, the same as the known rack, where two sides of the frame piece abut perpendicularly on each other and where both sides of the frame piece have identical rows of identical fastening receptacles aligned with each other. Therefore the rack has the same universal installation possibilities as the known control cabinet.

Figure 5:
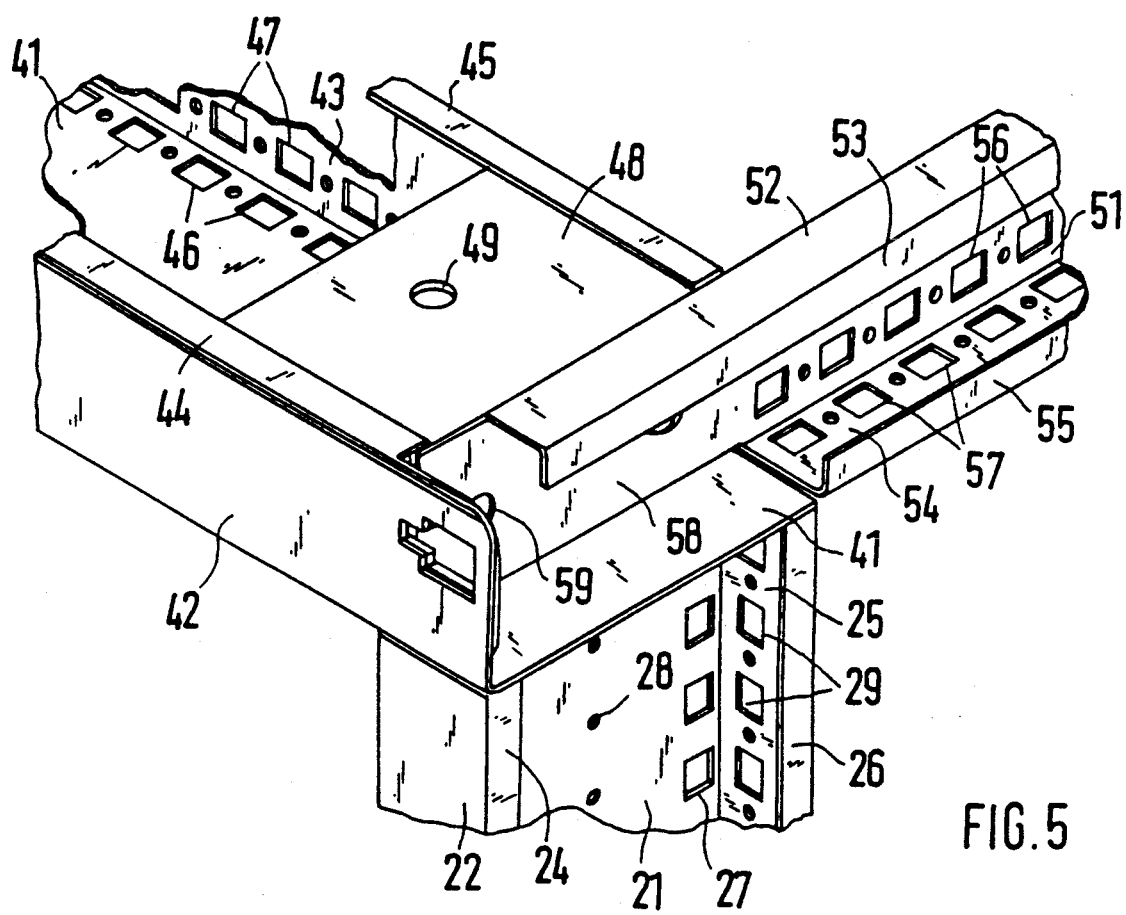
FIG. 5 is a partial perspective view of a corner of the assembled rack in accordance with one embodiment of this invention.
Figure 6:
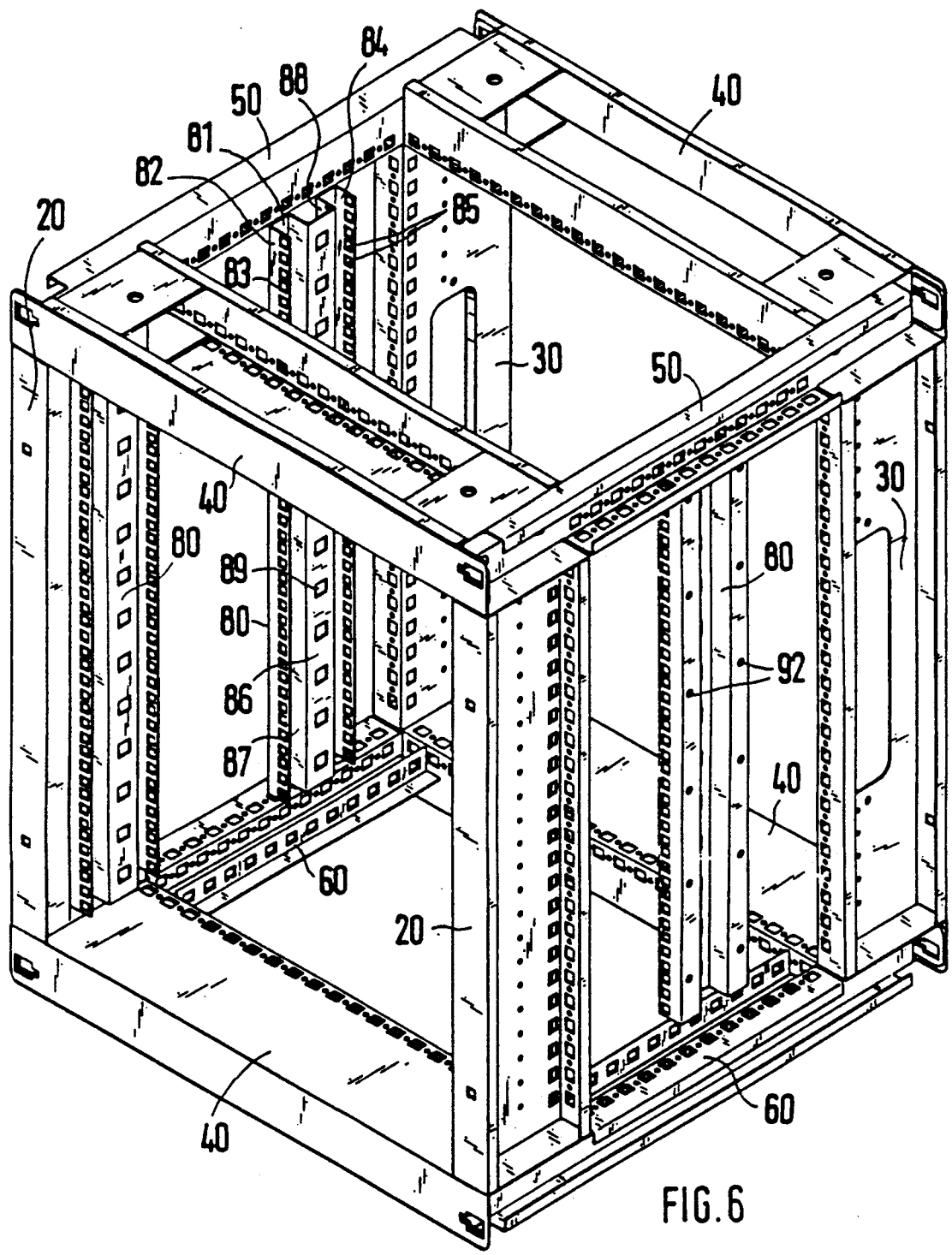
FIG. 6 is a perspective view of the rack in accordance with one embodiment of this invention with the installation rails installed.

The depth braces 50 or 60 have fastening tongues 58 with fastening bores 59, which are extensions of the base leg 51 or 61. So that the depth braces 50 or 60 can be connected to the frame, the inner lateral legs 43 of the horizontal frame pieces 40 are correspondingly recessed in the corner areas. Corner connectors 48 are welded to the ends of the horizontal frame pieces 40, which have a fastening plate 70 with fastening bores 71. After insertion through the recess in the inner lateral leg 43 of the horizontal frame piece 40, the fastening flange 58 of the depth brace 50 or 60 can be screwed together to the fastening plate 70 of the corner connector 48. Here, the inner lateral leg 54 of the depth brace 50 or 60 extends as far as the inner lateral leg 25 of the vertical brace 20 or 30, and the end sections 26 and 55 of the lateral legs 25 and 54 are located in one plane and constitute an attachment frame. The outer lateral leg 52 of the depth brace 50 or 60 is located in one plane with the end section 45 of the inner lateral leg 43 of the horizontal frame piece 40 and also forms an attachment frame with it, as shown in FIG. 5.

Figure 7:
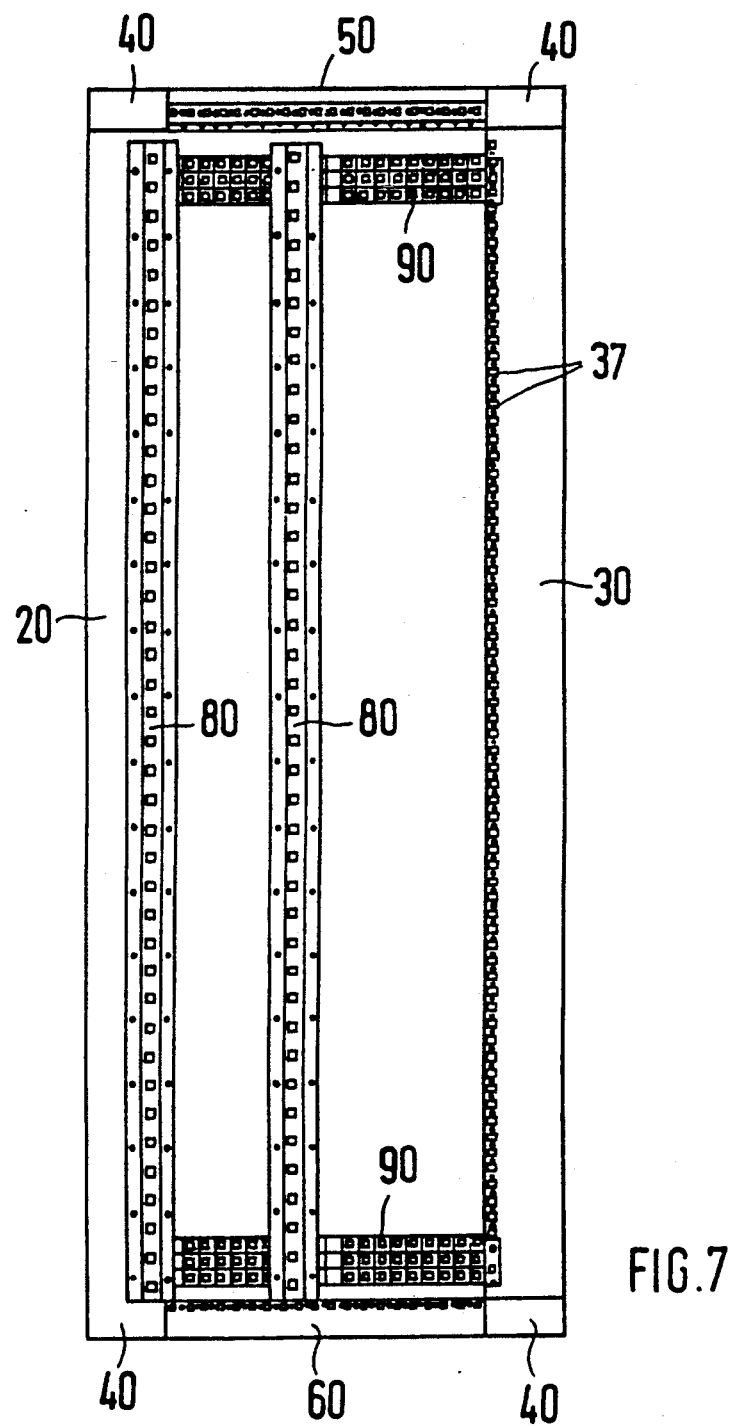
FIG. 7 is a view of the inside of the rack in accordance with one embodiment of this invention with the installation rails attached.

If components with inch division are to be installed, installation rails 80 are used, which are directly connected to the front vertical frame pieces 20 or are attached on mounting rails 90, which are installed between the front and rear vertical frame pieces 20 and 30, as FIG. 7 shows.

The installation rails 80 extend over the portion of the cabinet height in which components in inch division are to be housed. The installation rails 80 are essentially U-shaped in cross section, having a base leg 81 and two lateral legs 82 and 84. The base leg 81 has fastening bores 92, by means of which the installation rail 80 can be connected to the vertical frame piece 20 or the mounting rails 90. The lateral legs 82 and 84, which are directed towards the interior of the rack 10, are provided with identical rows of identical fastening receptacles 83 and 85 in inch division, so that the fastening possibilities are adapted to the inch division of the components to be installed.

In its central area, the base leg 81 can have two support sections 87 and 88, which are perpendicularly bent upwards and are connected to each other in the plane of the ends of the lateral legs 82 and 83 by an attachment section 86. In this way, a fastening possibility for slide rails is created with hanger receptacles 89, on which component supports or the like are supported so they can be pulled out. In this case, the installation rails 80 connected to the mounting rails 90 can be fastened at distances, determined by the depth of the components, in relation to the installation rails 80 connected to the front vertical frame pieces 20. Also, several short sections of lengths adapted to inch division can be fastened on the mounting rails 90 at different distances in relation to the installation frames 90 connected to the front vertical frame pieces 20.

I claim:

1. In a rack for a control cabinet comprising a front frame and a rear frame with a plurality of corner areas having a plurality of vertical and horizontal frame pieces, said front and rear frames connected to each other by a plurality of upper depth braces and lower depth braces, the vertical and horizontal frame pieces, welded together in each of said corner areas with a corner connector, and the depth braces each forming, with two sides disposed perpendicular to each other, an inner edge, and a plurality of identical side rows of identical fastening receptacles or fastening bores disposed in each of said sides at a same distance from said inner edge, said vertical frame pieces and said horizontal frame pieces having identical cross sections and identical frame rows of said fastening receptacles or fastening bores, the improvement comprising:

each of said vertical frame pieces and said horizontal frame pieces (20, 30, 40) and said depth braces (50, 60) embodied as a C-profile having a base leg (21, 31, 41, 51, 61) and two lateral legs (22, 25; 32, 35; 42, 43; 52, 54, 62, 64), each of said lateral legs having an end section (24, 26; 34, 36;, 44, 45; 53, 55; 63, 65) bent at a right angle and oriented towards the other of said two lateral legs on said base leg, and forming an open side between said end sections, the open side of each of the C-profile sections facing outwardly from the rack (10), and the horizontal frame pieces (40) covering the vertical frame pieces (20, 30) in each of said corner areas, each of the base legs (21, 31; 41, 51; 61) and each of the lateral legs (25, 35; 43, 54; 64) of each of the C-profile sections inwardly directed toward an interior of said rack (10) forming a row of said fastening receptacles (27, 29; 37, 39; 46, 47; 56, 57; 66, 67) or fastening bores (28, 38) in a metric division, each of said corner connectors (48) welded into an end area of the horizontal frame pieces (40), the inwardly directed lateral leg (43) of each of said horizontal frame pieces (40) forming a recess in said end area, each of said depth braces (50, 60) having an extended base leg (51, 61) forming a plurality of fastening flanges (58) connected to said corner connectors (48), said extended base legs (51, 61) of said depth braces terminating flush with the base legs (21, 31, 41) of the vertical frame pieces (20, 30), and a plurality of installation rails (80), extending over at least a portion of the height of the rack (10) and having rail lateral legs (82, 84) forming a plurality of rail fastening receptacles (83, 85) in inch divisions, connected to the base legs (21, 31) of the vertical frame pieces (20, 30) and to a plurality of mounting rails (90) installed between the front and rear vertical frame pieces (20, 30).

2. In a rack in accordance with claim 1, wherein each of a vertical frame front surface of said vertical frame pieces abuts on the horizontal frame base legs (41) of the horizontal frame pieces (40) and are welded to said horizontal frame base legs, each of a horizontal frame front surface of the horizontal frame pieces terminates flush with the end sections (24, 26; 34, 36) of the vertical frame pieces (40) and the lateral legs (22, 32, 42) of the vertical and horizontal frame pieces (20, 30, 40) opposite said inwardly directed lateral legs (25, 35, 43) are disposed in one plane and form an attachment frame.

3. In a rack in accordance with claim 1, wherein the end sections (55, 65) of the inwardly directed lateral legs (54, 64) of the depth braces (50, 60) are disposed in one plane with the end sections (26, 36) of the inwardly directed lateral legs (25, 35) of the vertical frame pieces (20, 30) and form an attachment frame.

4. In a rack in accordance with claim 1, wherein each of said rear vertical frame base legs (31) of said rear vertical frame pieces forms an opening (91).

5. In a rack in accordance with claim 1, wherein each of said installation rails (80) is a U-shaped profile section having an installation rail base leg (81) and two installation rail lateral legs (82, 84) and said installation rail lateral legs (82, 84) form a plurality of installation rail fastening receptacles (83, 85).

6. In a rack in accordance with claim 5, wherein the installation rail base leg (81) of each said installation rail (80) has an elevated attachment section (86) in the center formed by two support sections (87, 88), which elevated attachment section (86) is located in the plane of the ends of the installation rail lateral legs (82, 84) and forms a row of hanger receptacles (89).

7. In a rack in accordance with claim 5, wherein the installation rail base legs (81) of the installation rails (80) form installation rail fastening bores (92).

8. In a rack in accordance with claim 2, wherein the end sections (55, 65) of the inwardly directed lateral legs (54, 64) of the depth braces (50, 60) are disposed in one plane with the end sections (26, 36) of the inwardly directed lateral legs (25, 35) of the vertical frame pieces (20, 30) and form a vertical attachment frame.

9. In a rack in accordance with claim 8, wherein each of said rear vertical frame base legs (31) of said rear vertical frame pieces forms an opening (91).

10. In a rack in accordance with claim 9, wherein each of said installation rails (80) is a U-shaped profile section having an installation rail base leg (81) and two installation rail lateral legs (82, 84) and said installation rail lateral legs (82, 84) form a plurality of installation rail fastening receptacles (83, 85).

11. In a rack in accordance with claim 10, wherein the installation rail base leg (81) of each said installation rail (80) has an elevated attachment section (86) in the center formed by two support sections (87, 88), which elevated attachment section (86) is located in the plane of the ends of the installation rail lateral legs (82, 84) and forms a row of hanger receptacles (89).

12. In a rack in accordance with claim 10, wherein the installation rail base legs (81) of the installation rails (80) form installation rail fastening bores (92).

13. In a rack in accordance with claim 11, wherein the installation rail base legs (81) of the installation rails (80) form installation rail fastening bores (92).

* * * * *